US009270164B2

(12) United States Patent
Bixel et al.

(10) Patent No.: US 9,270,164 B2
(45) Date of Patent: Feb. 23, 2016

(54) METHODS, SYSTEMS, COMPUTER PROGRAM PRODUCTS, AND DEVICES FOR RENEWABLE ENERGY SITE POWER LIMIT CONTROL

(71) Applicant: TMEIC Corporation, Roanoke, VA (US)

(72) Inventors: Paul S. Bixel, Salem, VA (US); Benjamin D. Rudolph, Roanoke, VA (US)

(73) Assignee: TMEIC Corporation, Roanoke, VA (US)

( * ) Notice: Subject to any disclaimer, the term of this patent is extended or adjusted under 35 U.S.C. 154(b) by 261 days.

(21) Appl. No.: 13/921,788

(22) Filed: Jun. 19, 2013

(65) Prior Publication Data
US 2014/0376289 A1 Dec. 25, 2014

(51) Int. Cl.
*H02M 1/42* (2007.01)
*H02J 3/38* (2006.01)
*H02M 7/493* (2007.01)

(52) U.S. Cl.
CPC ............... *H02M 1/42* (2013.01); *H02J 3/382* (2013.01); *H02M 7/493* (2013.01)

(58) Field of Classification Search
CPC ....................................................... H02M 1/42
See application file for complete search history.

(56) References Cited

U.S. PATENT DOCUMENTS

| 4,994,981 A * | 2/1991 | Walker ...................... H02J 3/32 307/125 |
| 5,923,158 A | 7/1999 | Kurokami et al. |
| 6,512,966 B2 | 1/2003 | Lof et al. |

(Continued)

FOREIGN PATENT DOCUMENTS

| WO | 2010095159 A | 8/2010 |
| WO | 2011032265 A | 3/2011 |

(Continued)

OTHER PUBLICATIONS

B. Thurairajah et al., "Cloud Statistics Measured With the Infrared Cloud Imager (ICI)", IEEE Transactions on Geoscience and Remote Sensing, vol. 43. No. 9, Sep. 2005, pp. 2000-2007.

(Continued)

*Primary Examiner* — Emily P Pham
(74) *Attorney, Agent, or Firm* — New River Valley IP Law, P.C.; Michele L. Mayberry

(57) ABSTRACT

The present invention provides methods, systems, computer program products, and devices for renewable energy site power limit control that address conditions of plant saturation and loop delay. In an exemplary embodiment, power limit control of the present invention is broken into two levels of control: a site-wide real power limit control that produces a single site-wide command, SitePlimCom, for all inverters, and inverter-level power limit control that outputs a command, Inv[x].PlimCom[k], for individual inverters. In some embodiments, the invention has one or more of the following features: an integrator with nonlinear gains, limit based anti-windup, a power limit control term based on the sum of both integrator and feed-forward terms, and an inverter-level controller designed to meet slew rate and site power overshoot constraints. The invention can be used at any renewable energy site employing inverters wherein improved dynamic control performance is needed, including solar, wind, and tidal energy sites.

18 Claims, 14 Drawing Sheets

(56) References Cited

U.S. PATENT DOCUMENTS

| | | |
|---|---|---|
| 7,315,462 B2 | 1/2008 | Melhem |
| 7,505,833 B2 | 3/2009 | Delmerico et al. |
| 7,843,085 B2 | 11/2010 | Ledenev et al. |
| 7,890,217 B2 | 2/2011 | Cardinal et al. |
| 7,899,035 B2 | 3/2011 | Eklund et al. |
| 7,913,181 B2 | 3/2011 | Kumar et al. |
| 7,923,862 B2 | 4/2011 | Cardinal et al. |
| 7,925,552 B2 | 4/2011 | Tarbell et al. |
| 7,952,897 B2 | 5/2011 | Nocentini et al. |
| 7,962,247 B2 | 6/2011 | Beekhuis |
| 7,966,100 B2 | 6/2011 | Beekhuis |
| 7,979,167 B2 | 7/2011 | Delmerico et al. |
| 8,044,533 B2 | 10/2011 | Schill |
| 8,053,930 B2 | 11/2011 | Cramer et al. |
| 8,076,625 B2 | 12/2011 | Mcdonald |
| 8,138,631 B2 | 3/2012 | Allen et al. |
| 8,184,460 B2 | 5/2012 | O'Brien et al. |
| 8,193,661 B2 | 6/2012 | Jagota et al. |
| 8,222,765 B2 | 7/2012 | Collins et al. |
| 8,242,634 B2 | 8/2012 | Schatz et al. |
| 8,260,469 B2 | 9/2012 | Gregory et al. |
| 8,289,183 B1 | 10/2012 | Foss |
| 8,299,412 B2 | 10/2012 | Pan |
| 8,338,989 B2 | 12/2012 | Thompson |
| 8,362,739 B2 | 1/2013 | Perot et al. |
| 8,391,032 B2 | 3/2013 | Garrity et al. |
| 8,467,208 B1 * | 6/2013 | Johns ............. H02M 1/4208 323/207 |
| 2003/0006613 A1 | 1/2003 | Lof et al. |
| 2009/0132302 A1 | 5/2009 | Beekhuis |
| 2010/0057267 A1 | 3/2010 | Liu |
| 2010/0145532 A1 | 6/2010 | Gregory et al. |
| 2010/0145533 A1 | 6/2010 | Cardinal |
| 2010/0253151 A1 | 10/2010 | Gerhardinger |
| 2011/0044083 A1 | 2/2011 | Thompson |
| 2011/0060474 A1 | 3/2011 | Schmiegel et al. |
| 2011/0163606 A1 | 7/2011 | Kumar et al. |
| 2011/0169344 A1 | 7/2011 | Suekane et al. |
| 2011/0231159 A1 | 9/2011 | Allert et al. |
| 2011/0273129 A1 | 11/2011 | Coe et al. |
| 2012/0004780 A1 | 1/2012 | Miller et al. |
| 2012/0039101 A1 | 2/2012 | Falk et al. |
| 2012/0049636 A1 | 3/2012 | Galbraith et al. |
| 2012/0084027 A1 | 4/2012 | Caine |
| 2012/0205974 A1 | 8/2012 | Mccaslin et al. |
| 2012/0205981 A1 | 8/2012 | Varma et al. |
| 2012/0217807 A1 | 8/2012 | Galler et al. |
| 2012/0235498 A1 | 9/2012 | Johnson |
| 2012/0243416 A1 | 9/2012 | Hussain et al. |
| 2012/0262960 A1 | 10/2012 | Giraut Ruso et al. |
| 2012/0326511 A1 | 12/2012 | Johnson |
| 2013/0013257 A1 | 1/2013 | Yamakawa et al. |

FOREIGN PATENT DOCUMENTS

| | | |
|---|---|---|
| WO | 2011101030 A | 8/2011 |
| WO | 2011126346 A | 10/2011 |
| WO | 2011129473 | 10/2011 |
| WO | 2011129473 A1 | 10/2011 |
| WO | 2011131631 A | 10/2011 |
| WO | 2012056212 A | 5/2012 |
| WO | 2012079729 A | 6/2012 |
| WO | 2012127334 A | 9/2012 |
| WO | 2012128803 A | 9/2012 |
| WO | 2012154921 A | 11/2012 |
| WO | 2013012677 A | 1/2013 |

OTHER PUBLICATIONS

C. Sivaraman and J. Comstock, "Micropulse Lidar Cloud Mask Value-Added Product Technical Report", Jul. 2011, ARM Climate Research Facility, 12 pages.

J. Carter et al., "Lidar 101: An Introduction to Lidar Technology, Data, and Applications, National Oceanic and Atmospheric Administration", Nov. 2012, Charleston, SC, 76 pages.

\* cited by examiner

US 9,270,164 B2

METHODS, SYSTEMS, COMPUTER PROGRAM PRODUCTS, AND DEVICES FOR RENEWABLE ENERGY SITE POWER LIMIT CONTROL

BACKGROUND OF THE INVENTION

1. Field of the Invention

The present invention is related to the control of power limits at renewable energy sites such as solar, wind, and tidal energy sites. More particularly, the present invention relates to renewable energy site power limit control that addresses conditions of plant saturation and loop delay.

2. Description of Related Art

Renewable energy sites are typically composed of multiple power conversion devices connected in parallel generating fixed frequency AC power to a grid. The devices are typically AC-AC or DC-AC inverters. Inverters are designed to extract maximum power from the renewable power supply, subject to a real power limit reference and often, a reactive power command.

A simple and common scenario is to configure inverters individually with the same fixed power limit and reactive power reference and allow them to operate independently to deliver power to the grid. The system is connected in terms of power output, but not control. However, this scenario tends to underutilize the total available power when it varies from inverter to inverter, and cannot regulate total site output power. Furthermore, such a system cannot regulate power at a point on the grid separated from the collective inverter outputs by grid impedance, especially when there are disturbances in grid voltage and load.

More recently, site controllers have been employed to reduce these problems by measuring site total power feedback to actively control site total power. As shown in FIG. 1, the site control loop 10 consists of commands 23 from the controller 12 to the inverters 18 and feedbacks 21 from the inverters 18 and/or a utility meter 14 back to the site controller 12. The inverters 18 are connected to a power source 16 such as a photovoltaic (PV) module, and a step-up transformer 20 may intervene between the inverters 18 and the power meter 14.

The site controller typically generates the site-wide inverter command by feeding the site power error between the feedback and reference through a PI or I controller to generate a site-wide power command and then divides that equally among inverters to generate a command to send to individual inverters. The inverter power controllers are typically much faster than the site control loop. Therefore it is important to implement as much control functionality by the inverter itself, if possible.

However, traditional controllers can be improved by an effective means of handling non-ideal plant saturation and control loop delay, which cause many problems. The methods, systems, computer program products, and devices of the present invention are designed to overcome the following challenges of non-ideal operation encountered when implementing site power limit control: 1) Poor utilization of available power near limits of inverter saturation when available power is unequally distributed among inverters. The plant can appear quite nonlinear in this situation and performance suffers if appropriate anti-windup and saturation-dependent integration techniques are not used; and 2) Degraded controller dynamic response due to significant delay in the communications channels used to implement the control loop. Loop delay can result in unnecessary integrator windup during reference slewing and general instability. It can also result in large site power overshoot in the case of a power surge if power limit commands are not distributed to inverters appropriately.

The first problem is that of quickly maximizing utilization of available power when it is unequally distributed among inverters. This might occur, for example, at a PV site on a cloudy day when the PV array is partially shaded. In this case, the total site output drops below the site power reference. To compensate, the present invention increases the site-wide inverter power limit commands by incrementing an integrator which changes according to the error between the site power limit reference and site power feedback. The change in the integrator is chosen to take into account the number of inverters which are capable of producing more power. Furthermore, the present invention provides anti-windup techniques to prevent the integrator from increasing while no inverter is capable of increasing power output.

The second problem is that of handling significant site control loop delay. This delay is due to site controller task time and communication latency. This delay greatly restricts controller bandwidth. To reduce dependence on loop delay, exemplary embodiments of the present invention employ a feed-forward term which provides a fast transient response independent of feedback loop delay. The feed-forward term sums with an error term which maintains zero steady state error. Loop delay causes undesired integrator windup when the power limit reference changes. In the present invention the integrator error term is modified to compensate for this effect of loop delay. Another side effect of loop delay is that instantaneous site power surges cannot be corrected in less time than the loop delay. Often, the utility imposes restrictions such as acceptable site power overshoot or site power positive slew rate. At a PV site, for example, available solar irradiance may change very quickly as clouds pass overhead. Although there is nothing that can be done to prevent a sudden drop in available power, a sudden increase in available power can be prevented, even if the site control loop is not quick enough to react to it. The present invention addresses this issue by constraining each inverter power limit to be no larger than a certain margin higher than the inverter output power. This margin is the effective maximum real power overshoot that could be expected to an instantaneous surge in available inverter power. Incidentally, the margin also has the effect of slew limiting inverter power up, which is typically desired.

Various power controllers exist, such as those described in U.S. Pat. Nos. 8,260,469; 7,923,862; 7,890,217; and 6,512, 966; as well as in U.S. Patent Application No. 2003/0006613 (which patents and publication are hereby incorporated by reference herein in their entireties), suffer from one or more of the limitations described herein. There is a need for improved renewable energy plant control that addresses issues of site power saturation and loop delay so that dynamic performance can be significantly improved.

SUMMARY OF THE INVENTION

An objective of the present invention is to improve existing renewable energy site power limit control systems subject to significant loop delay and site saturation.

The present invention achieves this objective by providing improved methods, systems, computer program products, and devices for providing power limit control at a renewable energy site. The invention addresses problems associated with site power saturation and loop delay by elements including an integrator with nonlinear gains, anti-windup, a power limit control term based on the sum of an integrator and feed-forward term, and/or an inverter-level controller designed to meet slew rate and site power overshoot constraints.

In one embodiment, the present invention provides methods and systems of power limit control for a renewable energy site comprising one or more inverters, which methods and systems comprise generating a site power limit command and an inverter power limit command.

In one embodiment, the site power limit command is generated by performing one or more of the following processes and operations: 1. calculating a feed-forward power limit reference PlimRef[k] based on a power limit reference slew control process; 2. calculating a power limit integrator limit; 3. calculating a power limit integrator increment; 4. integrating an error integral term; 5. adding said power limit reference to said error integral term to yield said site power limit command; and 6. distributing said site power limit command among one or more inverters that are enabled at the site.

In another embodiment, the feed-forward power limit reference is compensated for loop delay.

In another embodiment, the inverter power limit command is generated by performing one or more of the following processes and operations: 1. calculating an inverter power limit command upper limit; 2. calculating an inverter power limit command based on an inverter power limit command slew control process; and 3. detecting whether an inverter is open loop.

In another embodiment, the present invention provides a system for renewable energy power limit control, comprising a renewable energy power limit controller operable to perform one or more of the processes and operations according to the invention that are described and/or depicted in this disclosure. In another embodiment, the system of the invention may further comprise one or more inverters in a two-way communication with said controller through a network. In another embodiment, the controller of the system of the invention may send a site power limit command or an individual inverter power limit command to the inverter or inverters. In another embodiment, the system may further comprise a site meter in communication with the controller through the network. In another embodiment, the controller of the system of the invention receives site inverter power feedback from the site meter. In another embodiment of the system of the invention, the controller receives inverter power feedback from each inverter. In another embodiment, the controller of the system of the invention comprises at least one processing element, a form of computer-readable memory, and a set of computer-executable instructions configured for performing one or more of the processes and operations according to the invention that are described and/or depicted in this disclosure. In another embodiment, the controller of the system of the invention is in further communication with a remote computer through said network, wherein said remote computer is configured with an operator interface.

In another embodiment, the present invention provides a computer program product comprising a set of computer-executable instructions configured for performing one or more of the processes and operations according to the invention that are described and/or depicted in this disclosure that is storable in a form of computer-readable memory or on a computer-readable medium.

In another embodiment, the present invention provides a device comprising at least one processing element, a form of computer-readable memory, and a set of computer-executable instructions configured for performing one or more of the processes and operations according to the invention that are described and/or depicted in this disclosure.

Specific embodiments of the invention provide a method of power limit control for a renewable energy site comprising generating a site power limit command by: (i) calculating a feed-forward power limit reference PlimRef[k]; (ii) integrating an error integral term; and (iii) adding said feed-forward power limit reference to said error integral term to yield a site-wide power limit command for a renewable energy site.

Such methods can also comprise dividing said site-wide power limit command by a number of enabled inverters at the site to obtain an individual inverter command.

Such methods can also comprise generating an individual inverter power limit command from either: i) a maximum based on said inverter power limit command and feedback; or ii) a slew rate limit to said site-wide power limit command.

Any of these methods, and other methods disclosed herein, can also comprise steps of calculating a power limit integrator limit and calculating a power limit integrator increment.

Such methods can include steps wherein said calculating of said feed-forward power limit reference is performed by a power limit reference slew control process comprising: (a) providing site inverter power feedback and an operator power limit reference; and (b) calculating said power limit reference based on: i) an upper limit based on said site inverter power feedback and said operator power limit reference; ii) a slew increment; and iii) said operator power limit reference.

Methods of the invention can comprise loop delay compensation of said feed-forward power limit reference. For example, said loop delay compensation in embodiments can comprise offsetting said feed-forward power limit reference by the delay term D to yield PlimRef[k-D]. Further, for example, said loop delay compensation in embodiments can be implemented by setting the delay term D to a nonzero number corresponding to the loop delay.

In embodiments, said power limit integrator limit can be calculated based on one or more or all of: i) said PlimRef[k-D]; ii) maximum inverter power feedback; iii) number of enabled inverters; and iv) site rated power limit reference.

Said power limit integrator increment can be calculated by multiplying a site power error and a gain which depends on a number of saturated inverters. For example, said power limit integrator increment in embodiments can be calculated by: i) subtracting site inverter power feedback from said PlimRef[k] or PlimRef[k-D] to generate an error term; and/or ii) scaling said error term by a saturation gain term and a constant Ki to generate a scaled error term.

In embodiments, said scaled error term can be integrated by: i) providing said scaled error term; and ii) integrating said scaled error term until it reaches said integrator limit to provide said error integral term.

In such methods of the invention, a windup of said scaled error term integration can be minimized by said integrator limit. Alternatively or in addition, windup of said scaled error term integration can be minimized by halting the integration when one or more or all applies: i) a number of inverters free to produce more power (NumInvFree) is zero; ii) said scaled error term reduces the absolute value of said integral term. Further, in embodiments, said error integral term can be added to said PlimRef[k] to provide a numerator for said power limit command distribution.

According to aspects of the invention, methods can be configured such that said power limit command distribution comprises dividing said numerator by said number of enabled inverters to generate a distributed site power limit command.

Any of the methods described herein can involve calculating an inverter power limit command upper limit. For example, said inverter power limit command upper limit calculation can be a function of said inverter power limit command and inverter power feedback. Alternatively or in addition, said inverter power limit command can be calculated based on an inverter power limit command slew control process.

In embodiments, said slew control process can be a function of: i) said inverter power command upper limit; and/or ii) a slew rate limit, which is applied when the inverter is detected as open loop and is a function of a slew rate increment; and/or iii) said site power limit command. Said slew rate increment can be equal to an inverter power rating when the inverter is not open loop.

An inverter according to methods and systems of the invention can be detected as open loop when said inverter power limit command is not equal to said site power limit command. Likewise, an inverter is not detected as open loop when said inverter power limit command is equal to said site power limit command.

Systems are also included within the scope of the invention, such as a system configured to perform one or more method or method steps described in this specification. For example, provided by embodiments of the invention is a system of power limit control for a renewable energy site comprising: one or more inverters; and a power limit controller in operable communication with at least one of the one or more inverters and operably configured to generate a site power limit command by: (i) calculating a feed-forward power limit reference PlimRef[k]; and/or (ii) integrating an error integral term; and/or adding said feed-forward power limit reference to said error integral term to yield a site power limit command for a renewable energy site.

Such systems can comprise distributing said site power limit command among some or all of said one or more inverters which are enabled at the site.

Alternatively or in addition in such systems, the power limit controller can be operably configured to generate an inverter power limit command. Alternatively or in addition, the power limit controller can be operably configured to calculate a power limit integrator limit and to calculate a power limit integrator increment.

In systems of the invention, the at least one of said one or more inverters can be in two-way communication with said controller through a network.

Alternatively or in addition, said controller of such systems can be operably configured to send a site power limit command or an individual inverter power limit command to at least one of or all of said one or more inverters.

Optionally, in system embodiments of the invention, the systems can comprise a site meter in communication with said controller through said network. In any of the systems described herein, said controller can be operably configured to receive site inverter power feedback from said site meter. In system embodiments, said controller can be operably configured to receive inverter power feedback from each of said one or more or all inverters. Additionally, systems of the invention can comprise any number of inverters.

In system embodiments of the invention, said controller can comprise: i) at least one processing element; ii) a form of computer-readable memory; and iii) a set of computer-executable instructions configured for performing one or more method or one or more method step described in this specification. Additionally or alternatively, the controller can be in communication with a remote computer through said network, wherein said remote computer is configured with an operator interface.

Also included within the scope of the invention is a computer program comprising a set of computer-executable instructions operably configured for performing one or more method described in this specification, which program is storable in a form of computer-readable memory or on a computer-readable medium.

Included within the scope of the invention is a device comprising: i) at least one processing element; ii) a form of computer-readable memory; and iii) a set of computer-executable instructions configured for performing one or more method or one or more method steps described in this specification.

Methods of the invention can alternatively or in addition comprise a method of power limit control for a renewable energy site, said method comprising Loop Delay compensation wherein said Loop Delay compensation is implemented by setting delay term D to a nonzero number corresponding to loop delay in either of two cases: (i) subtracting present inverter feedback signal from a corresponding reference generated LoopDelay seconds prior in order to compute an integration error increment; or (ii) basing inverter level power limit maximum on an inverter command generated LoopDelay seconds prior.

Additional embodiments of the invention and aspects of these embodiments will become apparent in the foregoing detailed description.

DETAILED DESCRIPTION OF VARIOUS EMBODIMENTS OF THE INVENTION

Reference will now be made in detail to various exemplary embodiments of the invention. However, the embodiments described in the description and shown in the figures are illustrative only and are not intended to limit the scope of the invention, and changes may be made in the specific embodiments described in this specification and accompanying drawings that a person of ordinary skill in the art will recognize are within the scope and spirit of the invention.

Figure 2:
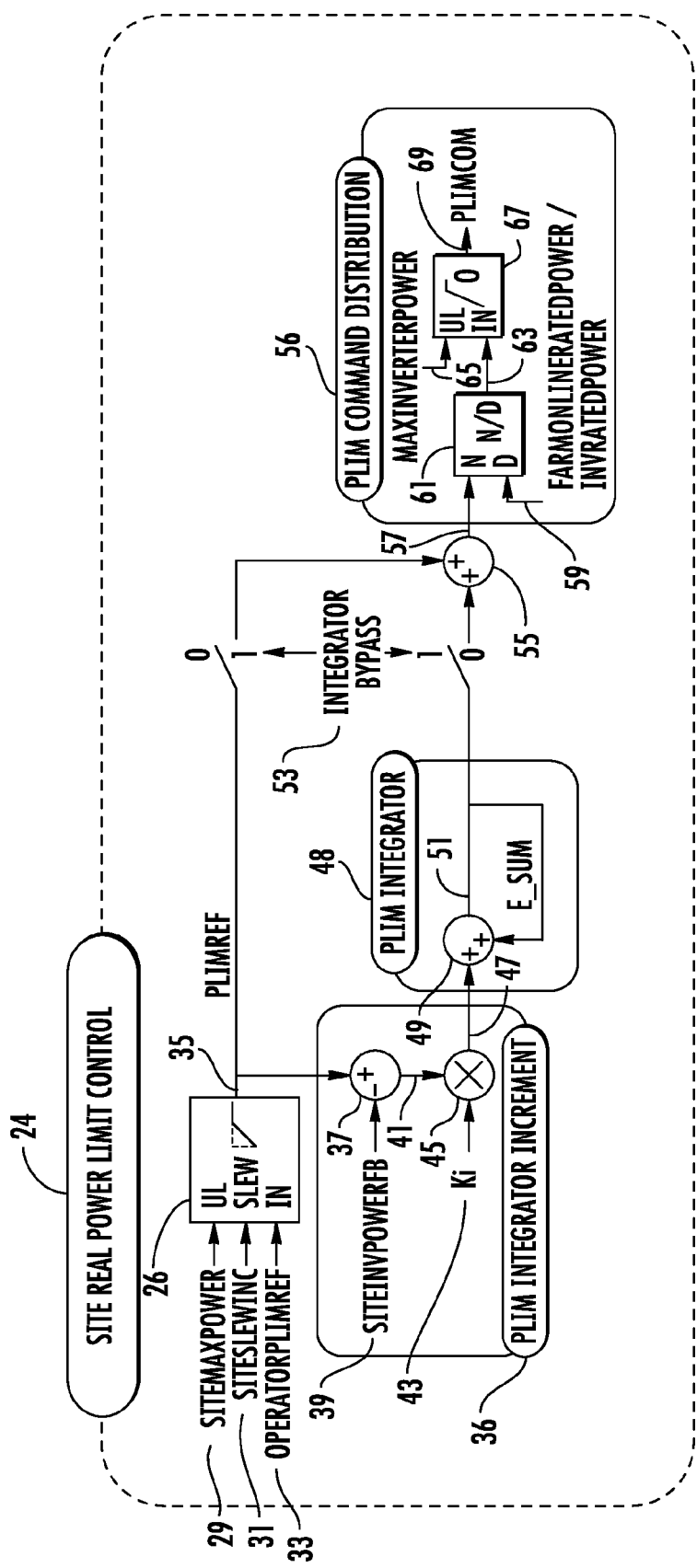
FIG. 2 is a block diagram of a renewable energy site real power limit control.

Conventional power limit controllers produce a single site power limit command, PLimCom, that is distributed equally across inverter controllers. A typical control process is shown in block diagram form in FIG. 2. As shown in FIG. 2, the typical control process 24 calculates 26 a feed-forward power limit reference (PlimRef) 35 based on inputs such as site maximum power (SiteMaxPower) 29, site slew increment (SiteSlewInc) 31, and operator power limit reference (OperatorPlimREf) 33. A power limit (Plim) integrator increment process 36 first subtracts 37 site inverter power feedback (SiteInvPowerFB) 39 from the feed-forward term 35. Then, the difference, total site power error 41 is multiplied 45 by the integrator time constant, Ki 43. The product 47 of this multiplication (the power limit integrator increment) is then added to e_sum 49 by the Plim integrator 48 to generate new summed error term (e_sum) 51. PlimRef 35, which may bypass 53 the integrator 48 or be used as input to the integrator increment 36, is added 55 to e_sum 51, the sum 57 of which is the power limit command, which is then processed by the Plim command distribution. This occurs by first dividing 61 the power limit command 57 by inverted rated power 59. The quotient 63 from this division 61 and a maximum inverter power upper limit 65 are used to calculate 67 the distributed power limit command (PLimCom) 69.

In the case of conventional controllers, the power error is processed by an integral (I) controller or other integral-type controllers such as proportional-integral (PI) or proportional-integral-derivative (PID). FIG. 2 shows an integrator implementation, but could be modified for PI or PID as well. The reference is slewed to provide a feed-forward power limit reference 35, which may be used in place of the integrator output 51 but not at the same time.

The present invention builds upon the traditional power limit controller to provide a method of power limit control to a renewable energy plant that overcomes difficulties commonly found in conventional controllers. One major issue present in conventional controllers is poor utilization of available power near limits of inverter saturation when available power is unequally distributed among inverters. The plant can appear quite nonlinear in this situation and performance suffers if appropriate anti-windup and saturation-dependent integration techniques are not used. Another issue is degraded controller dynamic response due to significant delay in the communications channels used to implement the control loop. Loop delay can result in unnecessary integrator windup during reference slewing and general instability. It can also result in large site power overshoot in the case of a power surge if power limit commands are not distributed to inverters appropriately.

The present invention overcomes these limitations by providing methods, systems, computer program products, and devices, which in some embodiments have one or more of the following: an integrator with nonlinear gains, limit based anti-windup, a power limit control term based on the sum of both integrator and feed-forward terms, and an inverter-level controller designed to meet slew rate and site power overshoot constraints. In an exemplary embodiment, power limit control of the present invention is broken into two levels of control: a site-wide real power limit control that produces a single site-wide command, SitePlimCom, for all inverters, and an inverter-level power limit control that outputs a command, Inv[x].PlimCom[k], for individual inverters.

Reference will now be made to block diagrams that illustrate the processes and operations of methods, systems, devices, and/or computer program products according to exemplary embodiments of the invention. However, there may be variations in the order of these operations, elimination of one or more operations, or substitution or addition of one or more new operations, that fall within the scope of the invention as appreciated by a skilled artisan.

Figure 3A:
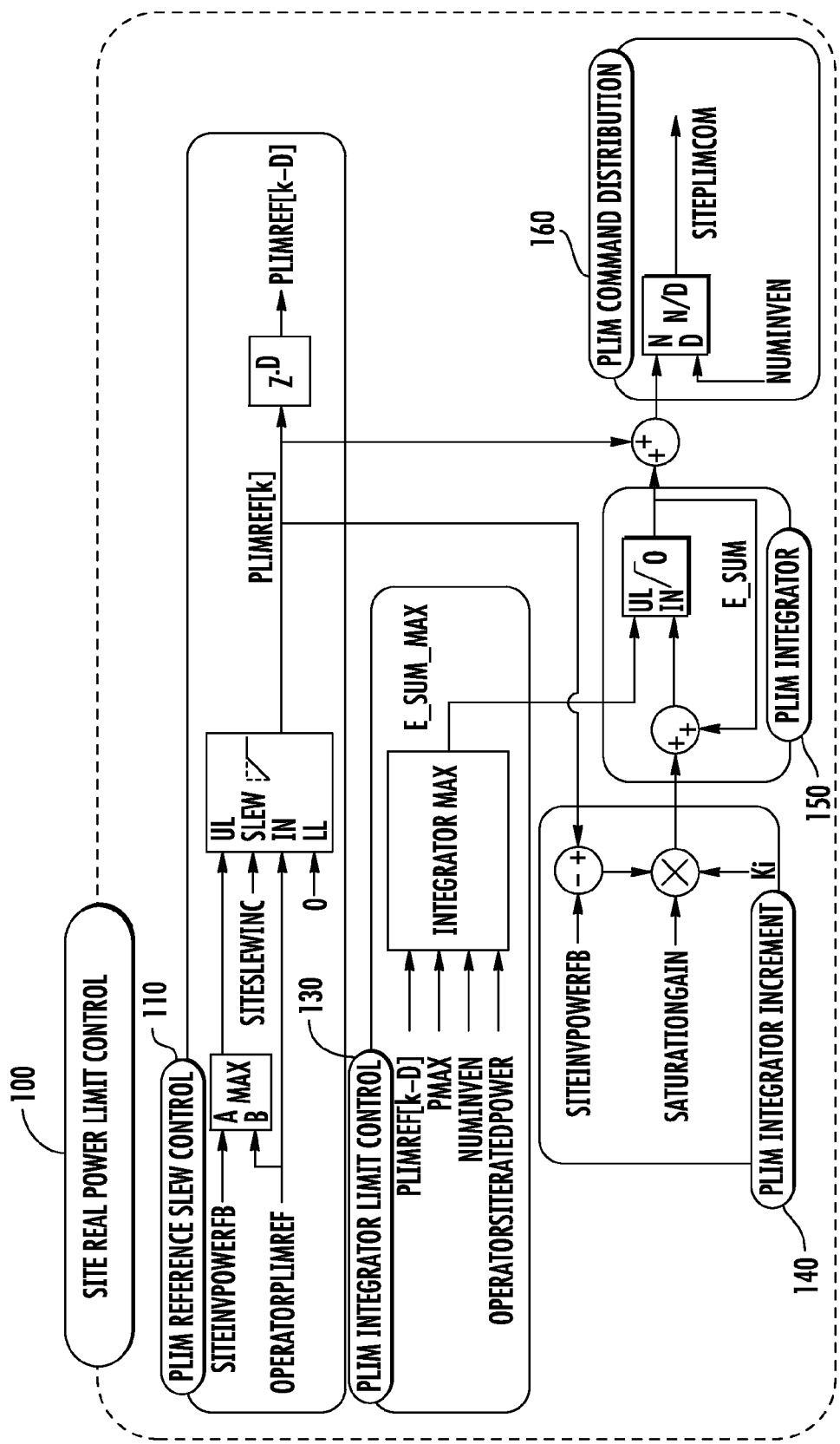
FIG. 3A is a block diagram showing an overview of an exemplary embodiment of renewable energy site real power limit control according to the invention which depicts the following processes: power limit reference slew control, power limit integrator limit control, power limit integrator increment calculation, power limit integration, and power limit command distribution.

FIGS. 3A-3F show these processes and operations. FIG. 3A shows an overview of an embodiment of site real power limit control 100 according to the invention. The site real power limit control 100 includes the following processes: power limit (Plim) reference slew control 110, Plim integrator limit control 130, Plim integrator increment calculation 140, Plim integration 150, and Plim command distribution 160. As will be described in further detail, the Plim reference slew control 110 calculates a feed-forward power limit reference that is used as input for the Plim integrator increment process 140 to calculate an integrator increment which is integrated by the Plim integration process 150 to calculate an error integral (or summed error term) that is limited by a value that is set by the Plim integrator limit control 130. The feed-forward power limit reference and error integral are summed and used to generate the distributed Plim command 160 by dividing by the number of enabled inverters on the site. As described in this specification, "enabled inverters" refer to those inverters which are both online and running. This command equally distributes the site power limit command among operating inverters. Certain exemplary embodiments of these processes and their operations and their interconnection will be further described below.

Figure 3B:
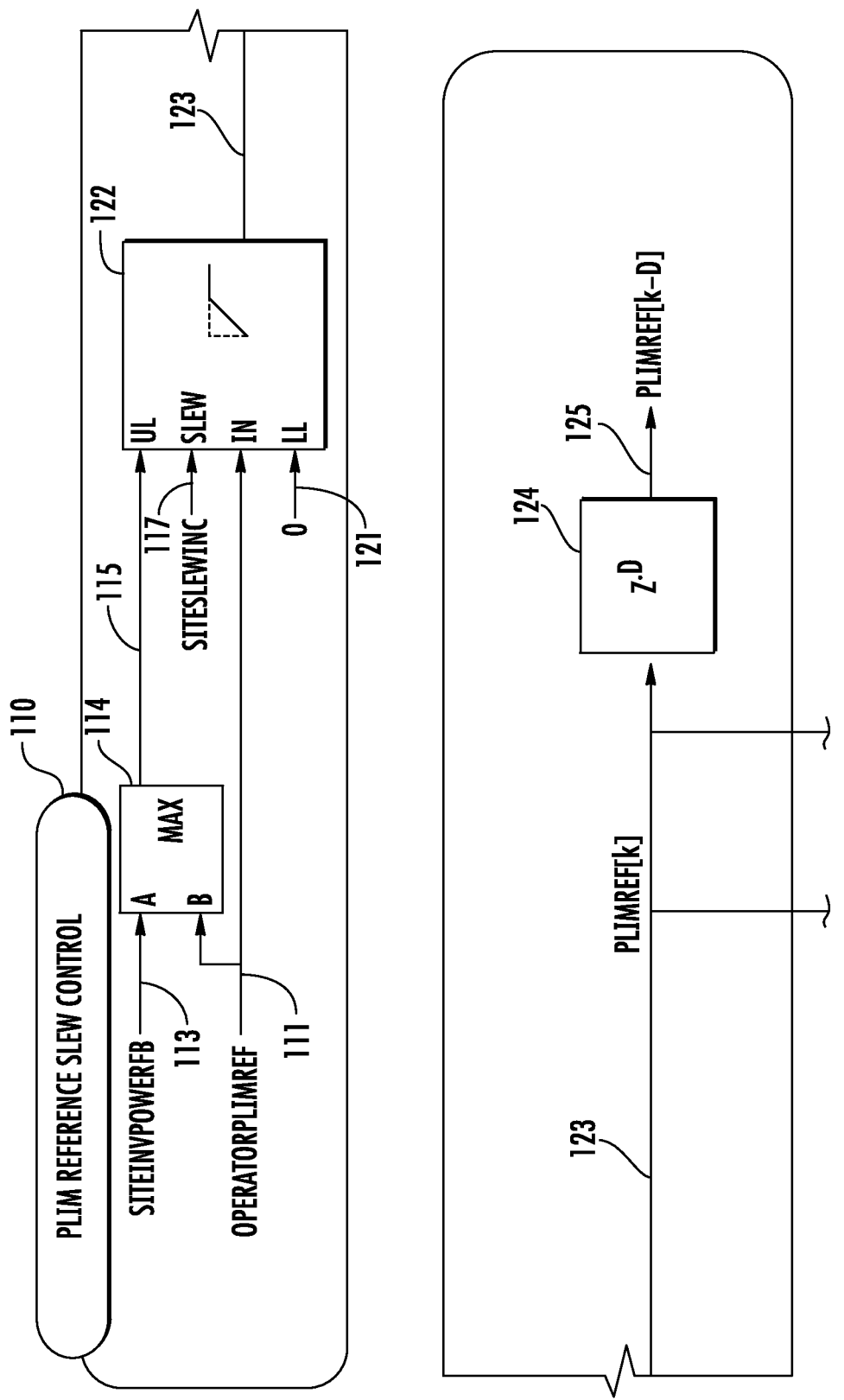
FIG. 3B is a block diagram showing an expanded view of an exemplary embodiment of the power limit reference slew control process shown in FIG. 3A.
Figure 3C:
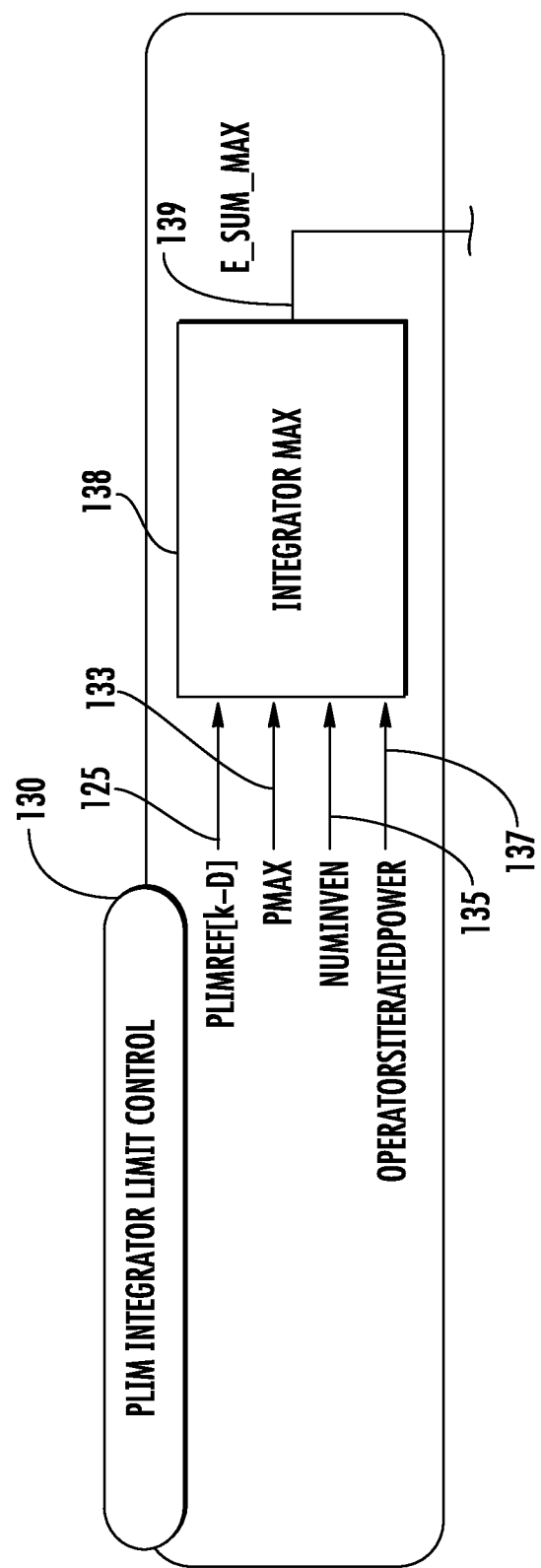
FIG. 3C is a block diagram showing an expanded view of an exemplary embodiment of the power limit integrator limit control process shown in FIG. 3A.

Reference will now be made to FIG. 3B which shows an embodiment of the feed-forward reference slew control process 110 according to the invention. The following merely describes one example of a feed-forward power limit reference generating process. For example, in one embodiment, the feed-forward reference PlimRef[k]123 may be calculated 122 by first slewing the operator power limit reference, as shown in FIG. 3B wherein 1111 represents the operator power limit reference (OperatorPlimRef). The slew rate may be set by a slew increment 117, which is the maximum amount that the power limit may change in one control period. Second, an upper limit 115 may be imposed on the site power limit reference 123. This upper limit 115 is the maximum 114 of site power feedback (SiteInvPowerFB) 113 and OperatorPlimRef 111. The lower limit 121 may be set at zero. This upper limit 115 eliminates unnecessary slew time and associated windup in some cases by allowing the feed-forward reference 123 to immediately drop to near the point at which the site power will begin to reduce with respect to the power limit reference 123. The feed-forward term 123 is designed to improve the power limit command response to a change in site power reference under ideal conditions when the integrator is a small fraction of the total command. In such cases, the effects of the feedback loop, and hence loop delay, are minimized. The feed-forward reference 123 may be time delayed 124 by the delay term D to generate a delayed feed-forward reference PlimRef[k-D]125.

Since the power limit controller often operates at available site power limits, saturation compensating techniques such as integrator anti-windup are essential for quick transitions in and out of site power limits. In one embodiment, shown in FIG. 3C, anti-windup may be implemented by imposing an upper limit 139 e_sum_max on the integrator 150 by the Plim integrator limit control process 130. For example, the integrator upper limit 139 may be calculated 138 as a function of four terms: 1) PlimRef[k-D]125, which may represent the delayed feed-forward reference if D is not 0; 2) Maximum inverter power feedback (PMAX) 133; 3) Number of enabled inverters (NumInvEn) 135; and 4) Site rated power limit reference (OperatorSiteRatedPower) 137.

The integrator limit 139 of the present invention prevents the integrator from increasing more than a certain fraction of the site rated power beyond the command for which no inverters are capable of producing more real power. By minimizing integrator windup in this way, the controller dynamic performance is dramatically improved for operation near the site available power limit.

Figure 3D:
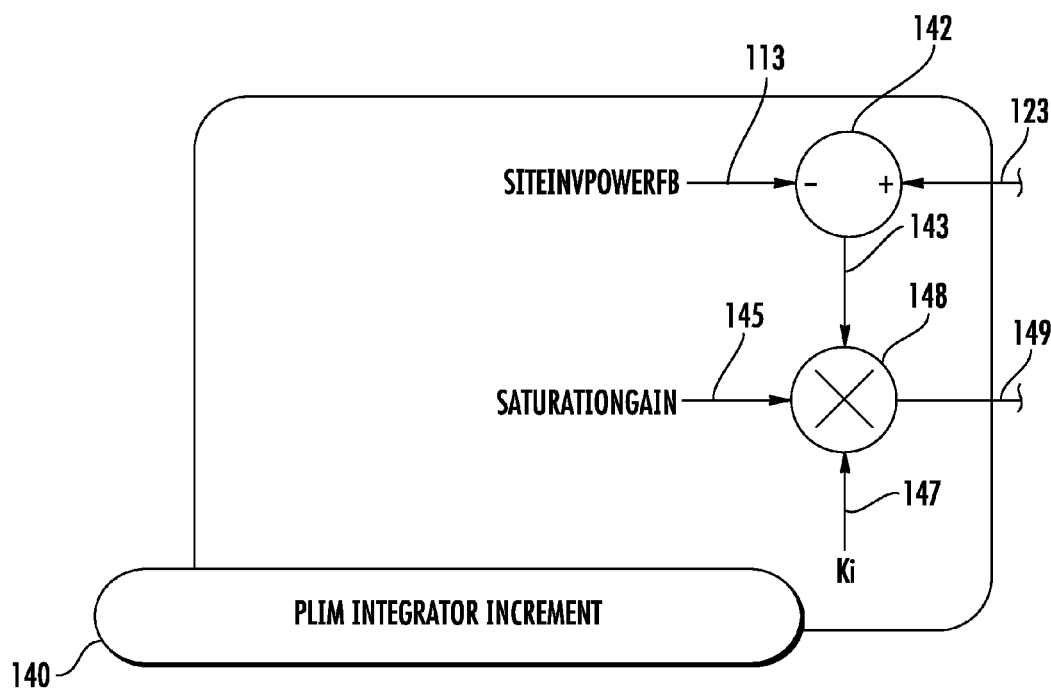
FIG. 3D is a block diagram showing an expanded view of an exemplary embodiment of the power limit integrator increment calculation process shown in FIG. 3A.

Turning to FIG. 3D, an embodiment of a process in which a Plim integrator increment is calculated 140 is shown. In this embodiment, the increment may be calculated as follows. First, the site power error 143 is calculated by subtracting 142 site total power feedback 113 from the power limit reference 123. The error 143 may be multiplied 148 by a gain composed of a constant, Ki 147, and a varying term called the SaturationGain 145. "Ki" as referred to in this specification is the classical integrator gain term typically used in PI or I controllers, and sets the time constant of the integrator. The SaturationGain term 145 may be computed based on the number of inverters currently not saturated, that is, capable of generating more real power. This time-varying SaturationGain term 145 is key to quickly maximizing site available power when available power is limited and unequally distributed among inverters.

Figure 3E:
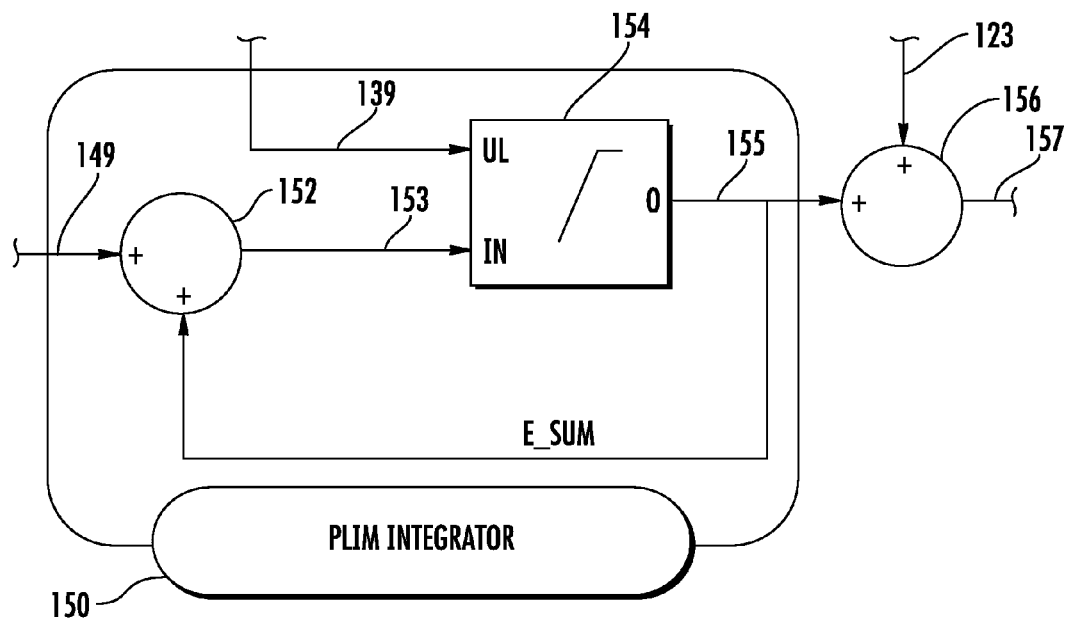
FIG. 3E is a block diagram showing an expanded view of an exemplary embodiment of the power limit integration process shown in FIG. 3A.
Figure 3F:
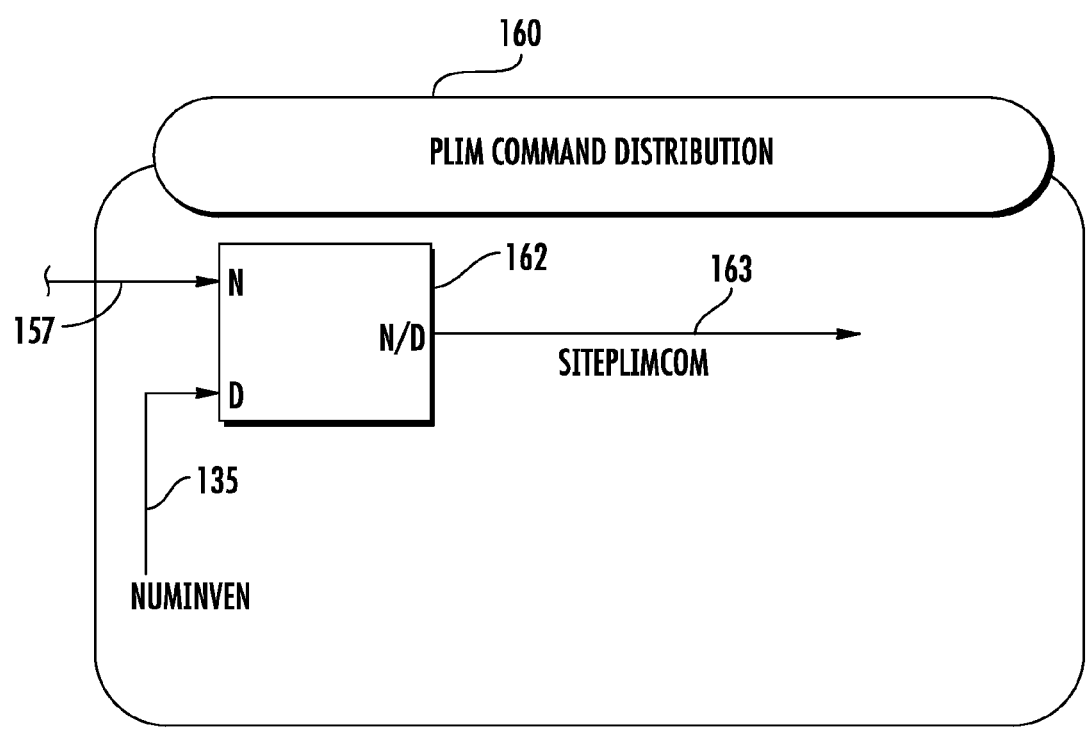
FIG. 3F is a block diagram showing an expanded view of an exemplary embodiment of the power limit command distribution process shown in FIG. 3A.

As shown in FIGS. 3E and 3F which depict the power limit integration process 150 and the power limit command distribution process 160 the scaled error 149 is then summed 152 with the error sum (e_sum) wherein the upper limit 139 is set 154 to this sum 153 and the resulting error integral (e_sum) 155 is summed 156 with the power limit reference 123 to generate a sum 157, the site-wide power limit command, which is divided 162 by NumInvEn 135 to yield the distributed site power limit command (SitePLimCom) 163.

Figure 4:
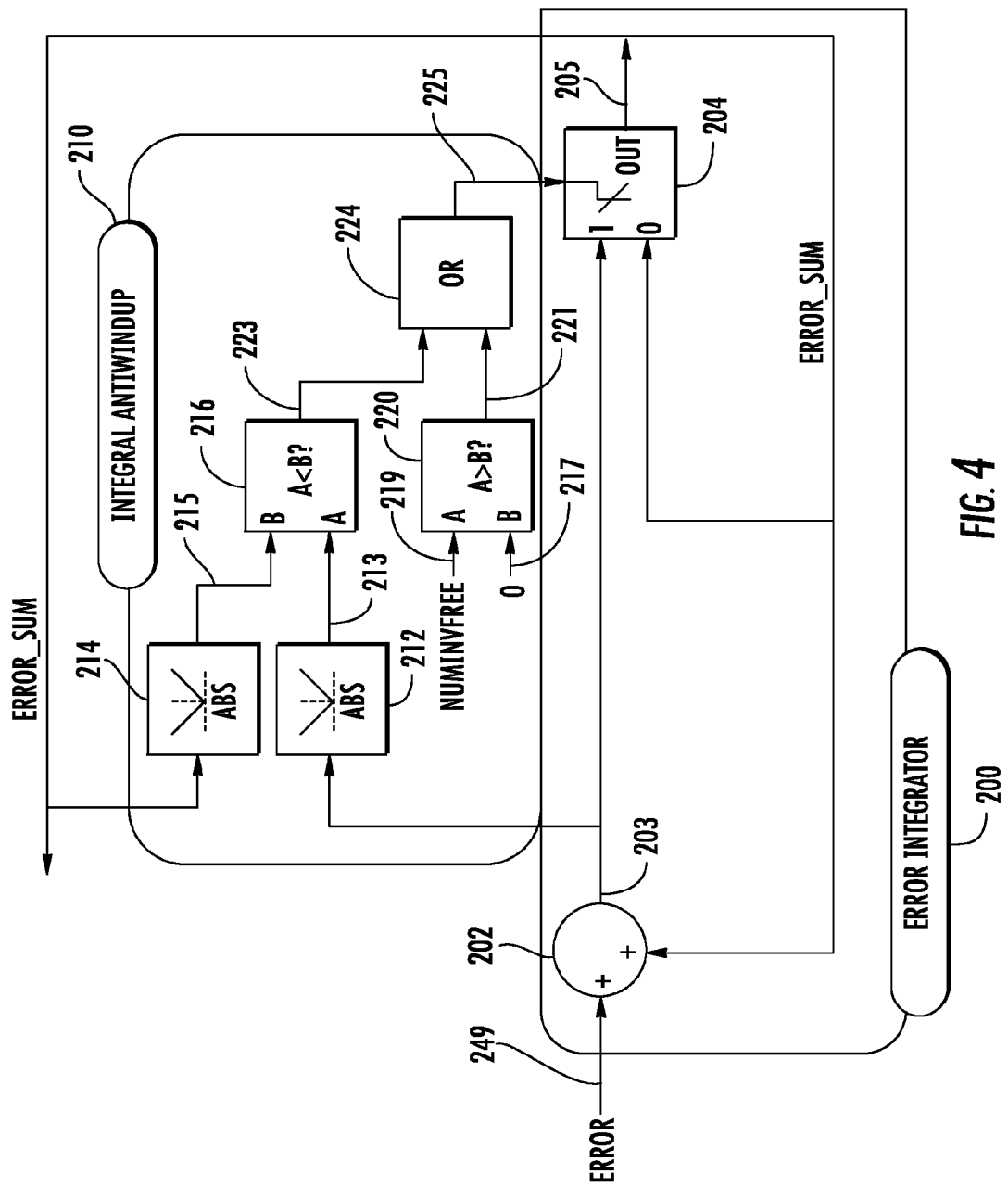
FIG. 4 is a block diagram showing an exemplary embodiment of an integrator anti-windup process according to the invention.

In another embodiment, anti-windup is implemented by simply halting the integrator when either all inverters are either deemed saturated, such that the number of inverters free to produce more power (NumInvFree) is zero, or the error is reducing the absolute value of the integral. In this case, the anti-windup would appear as FIG. 4 which shows an error integrator 200 with integral anti-windup 210. As shown in FIG. 4, the error 249 is summed 202 in either two situations (as indicated by OR operator, 224): situation 221 when the number of free inverters 219 is greater than 220 zero 217 or situation 223 when upon conversion 212 and 214 of the summed errors 203 and 205 to absolute values, A 213 and B 215, A is less than B 216. When either of these conditions is present 225, error_sum is generated 205, if not, the integrator is halted 204.

Figure 5A:
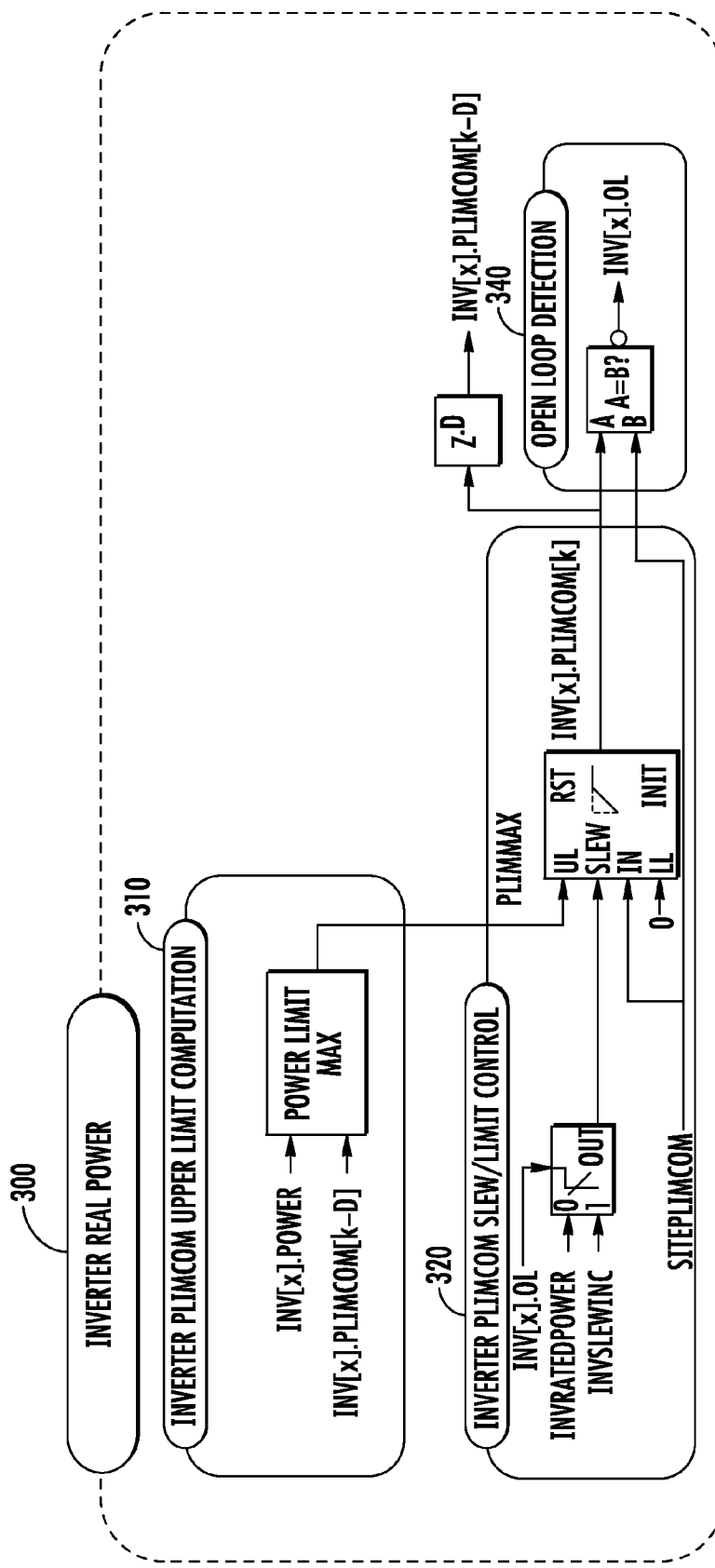
FIG. 5A is a block diagram showing an overview of an exemplary embodiment of renewable energy site inverter real power control according to the invention which depicts the following processes: inverter power limit command upper limit computation, inverter power limit command slew control, and open loop detection.

FIG. 5A shows an overview of an embodiment of inverter-level real power control 300 for generating a command for individual inverters. The inverter-level real power control 300 may comprise one or more of the following processes: inverter PlimCom upper limit computation 310, inverter PlimCom slew/limit control 320, and open loop detection 340. These processes and their operations will be shown in the following figures.

Figure 5B:
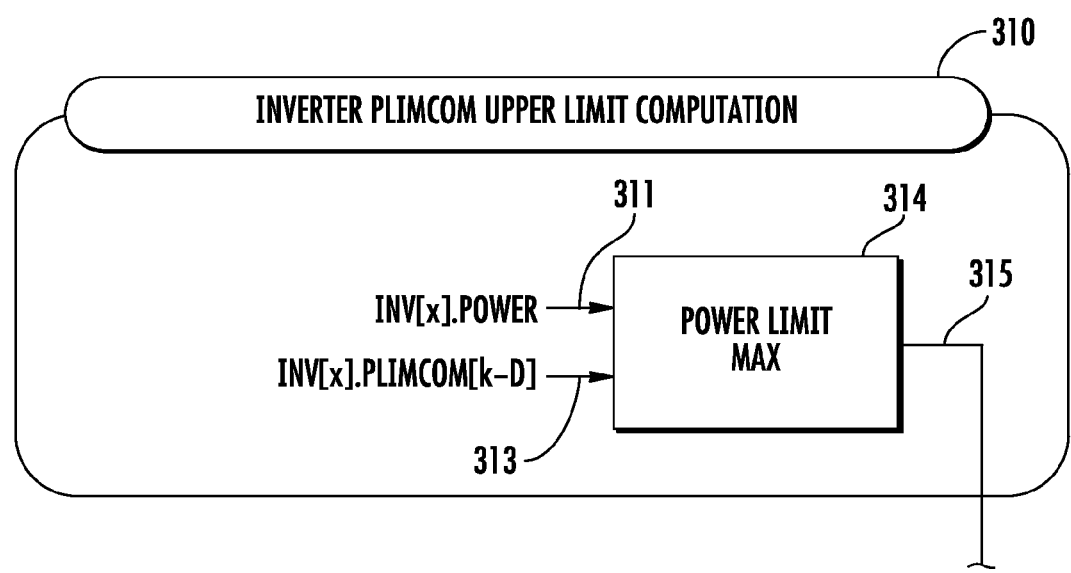
FIG. 5B is a block diagram showing an expanded view of an exemplary embodiment of an inverter power limit command upper limit computation process shown in FIG. 5A.
Figure 5C:
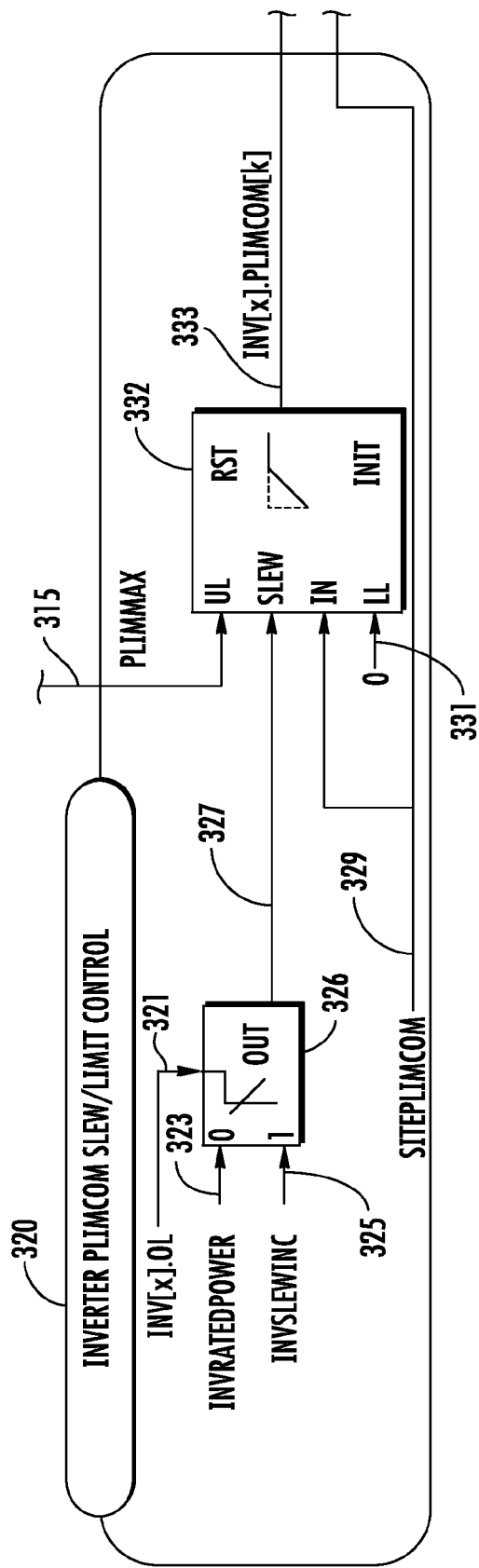
FIG. 5C is a block diagram showing an expanded view of an exemplary embodiment of an inverter power limit command slew control process shown in FIG. 5A.

As shown in FIGS. 5B and 5C, the site-wide inverter command of the present invention may then be further constrained at the inverter level. For example, to reduce site overshoot and rapid site power increase in the case of dramatic disturbances in available power, the site-wide inverter command 329 may be further constrained at the inverter level by either of two limits: 1) As shown in FIG. 5B, an upper limit PlimMax 315 which may be a function 314 of the inverter power feedback Inv[x].Power 311 and the current power limit command Inv[x].PlimCom[k-D]313. The upper limit 315 is preferably designed to limit the worst case site-wide overshoot that might result from a steep disturbance in site available power. The lower limit as shown in FIG. 5C is set to zero 331. 2) As shown in FIG. 5C, a slew rate limit 327 which may be calculated 326 only when the inverter is considered open loop Inv[x].OL 321. As used in this specification and shown in the open loop detection process 340 of FIG. 5D, an inverter is deemed "open-loop" when its command 333 is not equal to the site-wide inverter command (SitePLimCom) 329. While open loop 321, the inverter command 333 will preferably slew toward the site-wide inverter command 329 until it reaches it, at which point 342 the inverter is deemed not open loop (or closed loop). When not open loop, the inverter power limit command slew rate limit 327 is preferably released by applying a slew increment InvSlewInc 325 equal to the inverter power rating InvRatedPower 323.

Another advantage of the present invention, only some of which are described herein, is it provides a simple method for correcting problems introduced by loop delay. Delay presents a major challenge to any control loop. In practice, there is a delay of a few seconds from site controller power limit command output to inverter power feedback. One technique for handling delay is computing a feed-forward control term based on known information about the site. The site power limit feed-forward term, for example, assumes that, under ideal conditions, the inverters will be able to track their power limit commands within one control period. This way, under ideal conditions the integrator will not have to wind up at all and thus dependence on the feedback loop and any associated delay has been eliminated.

Figure 5D:
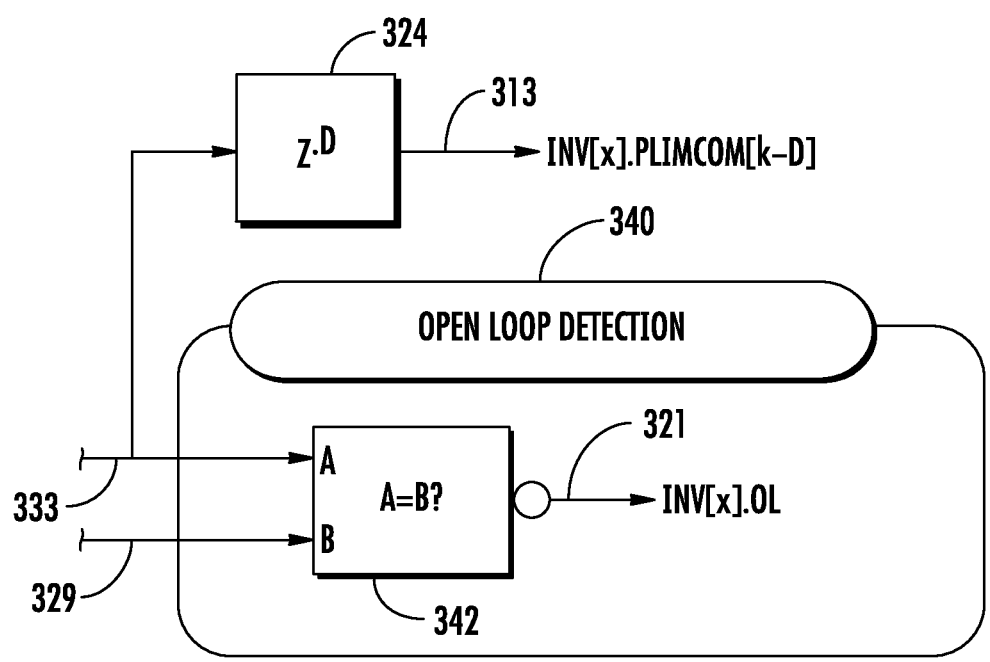
FIG. 5D is a block diagram showing an expanded view of an exemplary embodiment of an open loop detection process shown in FIG. 5A.

Ideally, delay compensation would involve predicting future inverter states by extrapolating current ones and using this information to optimally distribute power commands to the site. The present invention, in one embodiment, provides a simpler technique to ensure that comparisons between commands and feedbacks use the command generated at the time t-LoopDelay rather than the present command. This technique is effective at improving dynamic performance when the command signal is varying with time. As shown in FIG. 5D, this feature is preferably implemented by setting the D offset to the loop delay to implement a time delay block 324 and corresponding delayed signal (Inv[x].PlimCom[k-D]) 313. To turn the feature off, D would be set to 0. This may be used in two places in the controller as shown by the following examples. First, the power limit reference, PlimRef[k-D], supplying the error term in the site power limit controller is replaced by PlimRef[k-LoopDelay/Ts], or just PlimRef[k-LoopDelay], since the control period, Ts, is 1 second in this application. This prevents unnecessary windup which can occur while slewing the reference while the site is not saturated. Such a case should not require integrator windup, since the inverters track their commands with high precision. Second, the power limit command, Inv[x].PlimCom[k-D]313, entering the power limit command maximum block 314 with inverter feedback power, Inv[x].Power 311 as shown in FIG. 5B, is replaced by Inv[x].PlimCom[k-LoopDelay]. This change leads to more stable and reliable site power limit control.

It will be understood that the various processes and operations of the Site Real Power Limit Control 100 and Inverter Real Power Control 300 described and/or depicted herein may be carried out by a group of computer-executable instructions that may be organized into routines, subroutines, procedures, objects, methods, functions, or any other organization of computer-executable instructions that is known or becomes known to a skilled artisan in light of this disclosure, where the computer-executable instructions are configured to direct a computer or other data processing device to perform one or more of the specified processes and operations. Embodiments of the invention include one or more computers or devices, or systems with such computers or devices, loaded with a set of the computer-executable instructions described herein wherein the one or more computers or devices are instructed and configured to carry out the processes and operations of the invention. The computer or device performing the specified processes and operations may comprise at least one processing element such as a central processing unit and a form of computer-readable memory which may include random-access memory (RAM) or read-only memory (ROM). The computer-executable instructions can be embedded in computer hardware or stored in the computer-readable memory such that the computer or device may be directed to perform one or more of the processes and operations depicted in the block diagrams and/or described herein. Embodiments of the invention also include a computer program product comprising one or more computer files comprising a set of computer-executable instructions for performing one or more of the processes and operations described and/or depicted herein. In exemplary embodiments, the files may be stored contiguously or non-contiguously on a computer-readable medium, in computer-readable memory on a single computer, or distributed across multiple computers. A skilled artisan will further appreciate, in light of this disclosure, how the invention can be implemented, in addition to software, using hardware or firmware. As such, as used herein, the operations of the invention can be implemented in a system comprising any combination of software, hardware, or firmware.

Figure 1:
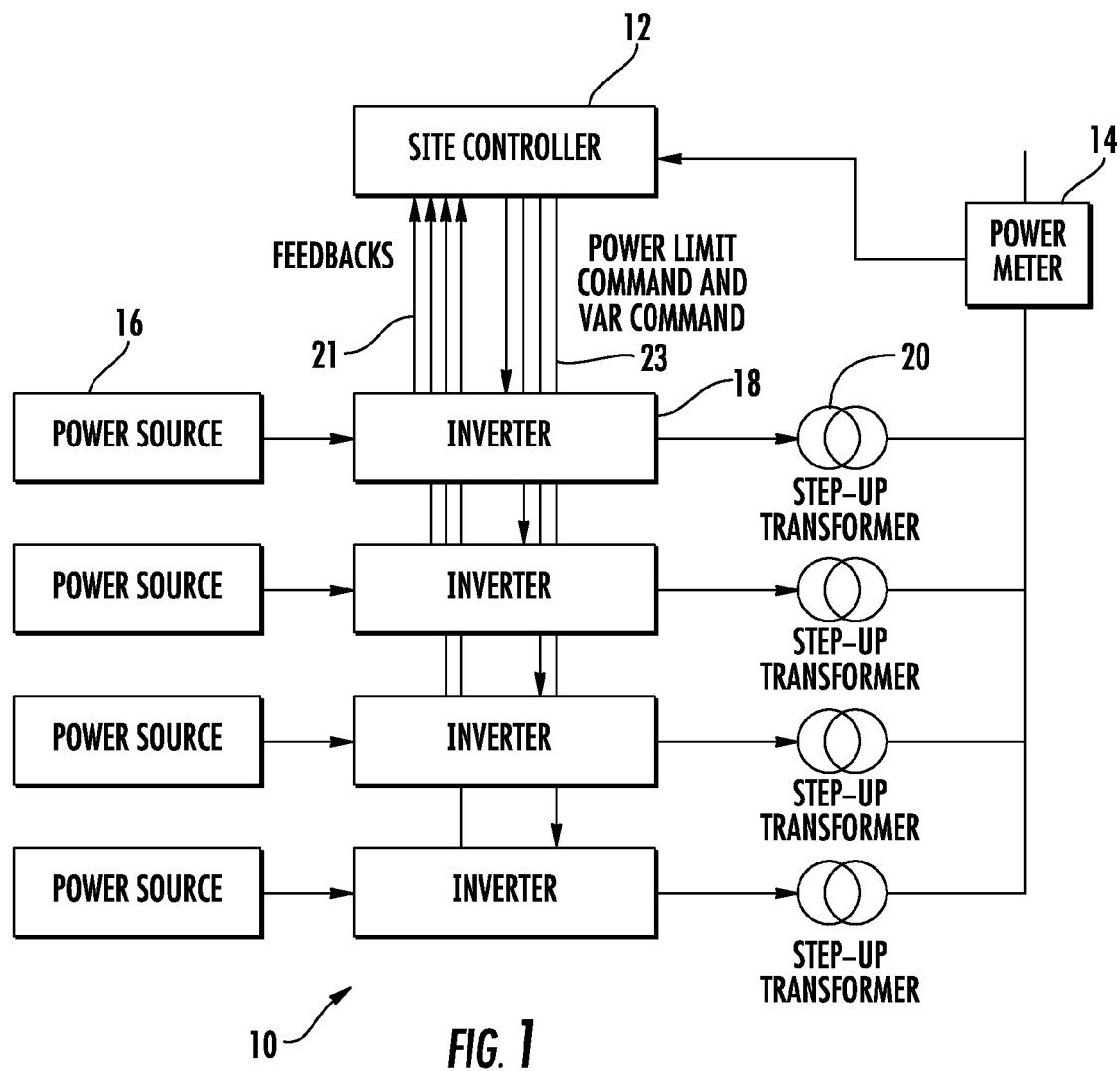
FIG. 1 is a schematic diagram of a renewable energy site control loop.
Figure 6:
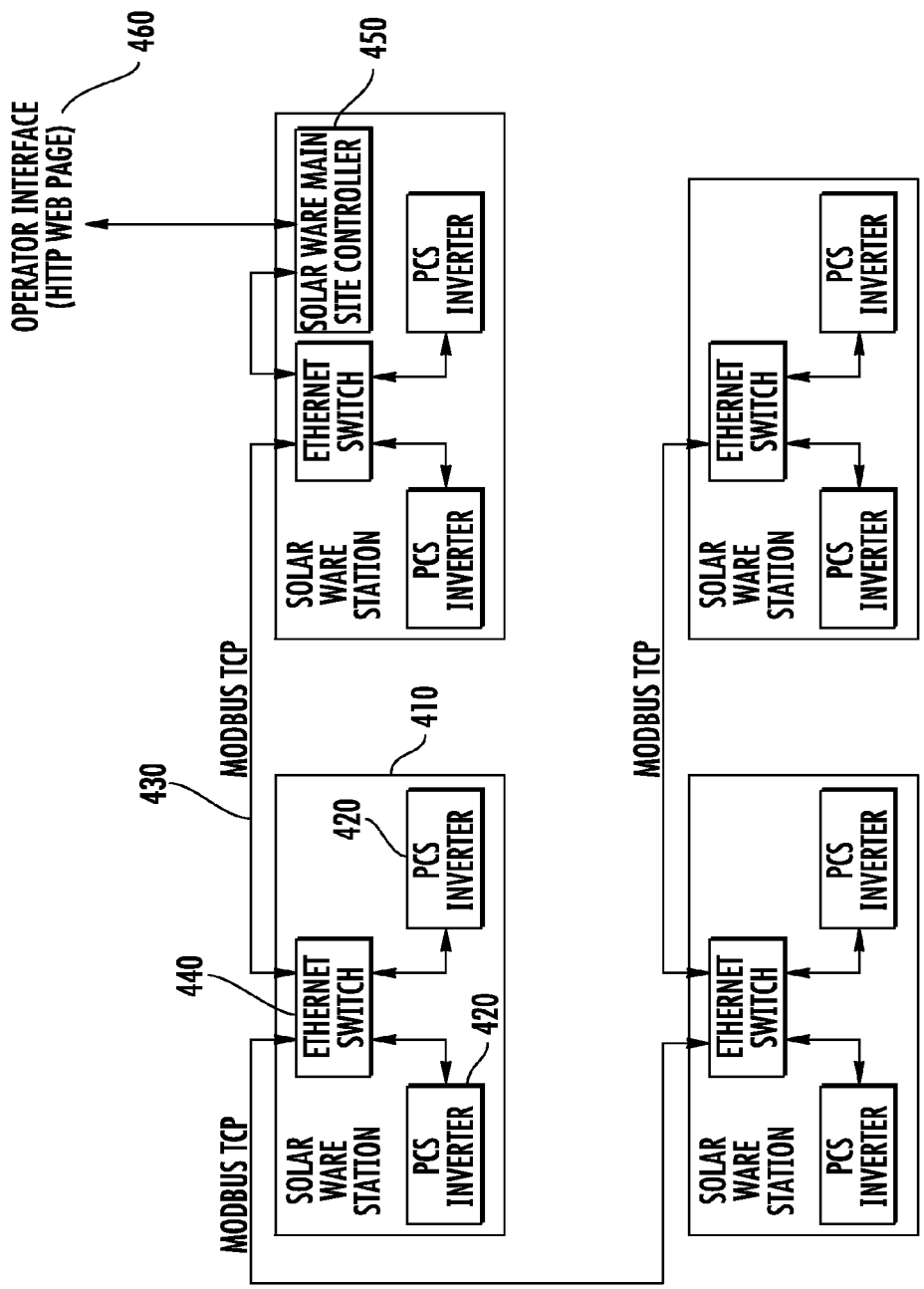
FIG. 6 is a schematic diagram showing an embodiment of a renewable energy site system according to the invention wherein a main site controller is configured for controlling a plurality of inverters through a network.

In an exemplary embodiment, a single computer or device may be configured at a renewable energy site to serve as a single Main Site Controller which receives feedbacks from the inverters and the site power meter and sends the site real power limit command and the inverter real power limit command through a network such as shown in FIG. 1 to one or more inverters of the renewable energy site. For example, FIG. 6 shows an embodiment of a renewable energy site system 400 according to the invention comprising a plurality of stations 410. Here the stations 410 are referred to as Solar Ware® stations, each station comprising at least one inverter 420. As illustrated, the stations 410 each comprise at least two inverters 420. In the context of the invention, there is no limit to the number of Solar Ware® stations that can be included in site system 400. The Solar Ware® stations 410 of system 400 may be interconnected using Ethernet connectivity wherein data is transmitted between stations through a Modbus TCP protocol 430. Commands and feedbacks may be sent to and from the inverters through a network interface such as an Ethernet switch 440. However, any suitable network protocol, including IP, UDP, or ICMP, as well any suitable wired or wireless network including any local area network, Internet network, telecommunications network, Wi-Fi enabled network, or Bluetooth enabled network may be used. The Main Site Controller 450 may be configured at one Solar Ware® station 410 to control the inverters 420 as well as receive inputs from the inverters 420 and from the site meter. The Main Site Controller 450 may allow an operator to control the power at the renewable energy site through an operator interface which may be a graphical user interface (GUI) which may be present at the Main Site Controller itself or be presented as an HTTP webpage 460 that may be accessed by the operator at a remote general purpose computer with a processor, computer-readable memory, and standard I/O interfaces such as a universal serial bus (USB) port and a serial port, a disk drive, a CD-ROM drive, as well as one or more user interface devices including a display, keyboard, keypad, mouse, control panel, touch screen display, microphone, etc. for interacting with the Main Site Controller through the GUI. The Main Site Controller 450 may be used to control the power limits of any renewable energy site employing one or more inverters that is connected to the public power grid, including but not limited to solar (photovoltaic), wind, and tidal energy sites.

The present invention has been described with reference to particular embodiments having various processes and operations. It will be apparent to those skilled in the art that various modifications and variations can be made in the practice of the present invention without departing from the scope or spirit of the invention. For example, in other embodiments, the power error may be processed by other types of integration processes such as PI or PID. Further, one skilled in the art will recognize that these processes and operations may be used singularly or in any combination, or one or more may be eliminated or substituted with an equivalent operation or process based on the requirements and specifications of a given application or design. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

The invention claimed is:

1. A method of power limit control for a renewable energy site comprising:
    generating a site-wide power limit command by:
        calculating a feed-forward power limit reference PlimRef[k];
        integrating an error integral term; and
        adding said feed-forward power limit reference to said error integral term to yield said site-wide power limit command for the renewable energy site; and
        dividing said site-wide power limit command by a number of enabled inverters at the renewable energy site to obtain an individual inverter command.

2. The method of claim 1 comprising Loop Delay compensation wherein said Loop Delay compensation is implemented by setting delay term D to a nonzero number corresponding to loop delay in either of two cases:
    subtracting present inverter feedback signal from a corresponding reference generated LoopDelay seconds prior in order to compute an integration error increment; or
    basing inverter level power limit maximum on an inverter command generated LoopDelay seconds prior.

3. The method of claim 1 comprising generating an individual inverter power limit command from either: i) a maximum based on said inverter power limit command and feedback; or ii) a slew rate limit to said site-wide power limit command.

4. The method of claim 1 comprising calculating a power limit integrator limit and calculating a power limit integrator increment.

5. The method of claim 1, wherein said calculating of said feed-forward power limit reference is performed by a power limit reference slew control process comprising:
  providing site inverter power feedback and an operator power limit reference; and
  calculating said power limit reference based on:
    i) an upper limit based on said site inverter power feedback and said operator power limit reference;
    ii) a slew increment; and
    iii) said operator power limit reference.

6. The method of claim 1 comprising loop delay compensation of said feed-forward power limit reference, wherein said loop delay compensation comprises offsetting said feed-forward power limit reference by a delay term D to yield PlimRef[k-D].

7. The method of claim 6, wherein said loop delay compensation is implemented by setting the delay term D to a nonzero number corresponding to a loop delay.

8. The method of claim 4, wherein said power limit integrator limit is calculated based on one or more of:
  i) a PlimRef[k-D];
  ii) maximum inverter power feedback;
  iii) number of enabled inverters; and
  iv) site rated power limit reference.

9. The method of claim 4 wherein said power limit integrator increment is calculated by performing one or more of: i) multiplying a site power error and a gain which depends on a number of saturated inverters; or ii) subtracting site inverter power feedback from said PlimRef[k] or PlimRef[k-D] to generate an error term and scaling said error term by a saturation gain term and a constant Ki to generate a scaled error term.

10. The method of claim 9, wherein said scaled error term is integrated by:
  i) providing said scaled error term; and
  ii) integrating said scaled error term until it reaches an integrator limit to provide said error integral term.

11. The method of claim 10, wherein windup of said scaled error term integration is minimized: i) by said integrator limit; or ii) by halting the scaled error term integration when one or more applies: (a) a number of inverters free to produce more power (NumInvFree) is zero; or (b) said scaled error term reduces an absolute value of said error integral term.

12. The method of claim 10, wherein said error integral term is added to said PlimRef[k] to provide a numerator for a power limit command distribution.

13. The method of claim 12, wherein said power limit command distribution comprises dividing said numerator by said number of enabled inverters to generate a distributed site power limit command.

14. The method of claim 1, wherein an inverter power limit command upper limit is calculated as a function of said inverter power limit command and inverter power feedback.

15. The method of claim 1, wherein said inverter power limit command is calculated based on an inverter power limit command slew control process as a function of:
  i) an inverter power command upper limit; or
  ii) a slew rate limit, which is applied when the inverter is detected as open loop and is a function of a slew rate increment; and
  iii) said site-wide power limit command.

16. A system of power limit control for a renewable energy site comprising:
  one or more inverters; and
  a power limit controller in operable communication with at least one of the one or more inverters and operably configured to generate a site-wide power limit command by:
    calculating a feed-forward power limit reference PlimRef[k];
    integrating an error integral term;
    adding said feed-forward power limit reference to said error integral term to yield said site-wide power limit command for the renewable energy site; and
    dividing said site-wide power limit command by a number of enabled inverters at the renewable energy site to obtain an individual inverter command.

17. The system of claim 16 comprising distributing said site power limit command among some or all of said one or more inverters which are enabled at the renewable energy site.

18. The system of claim 16 wherein the power limit controller is operably configured to generate an inverter power limit command.

* * * * *